Dec. 13, 1949           J. STIVIN           2,491,340
ELECTRICAL CONTROL SYSTEM
Filed Feb. 25, 1947
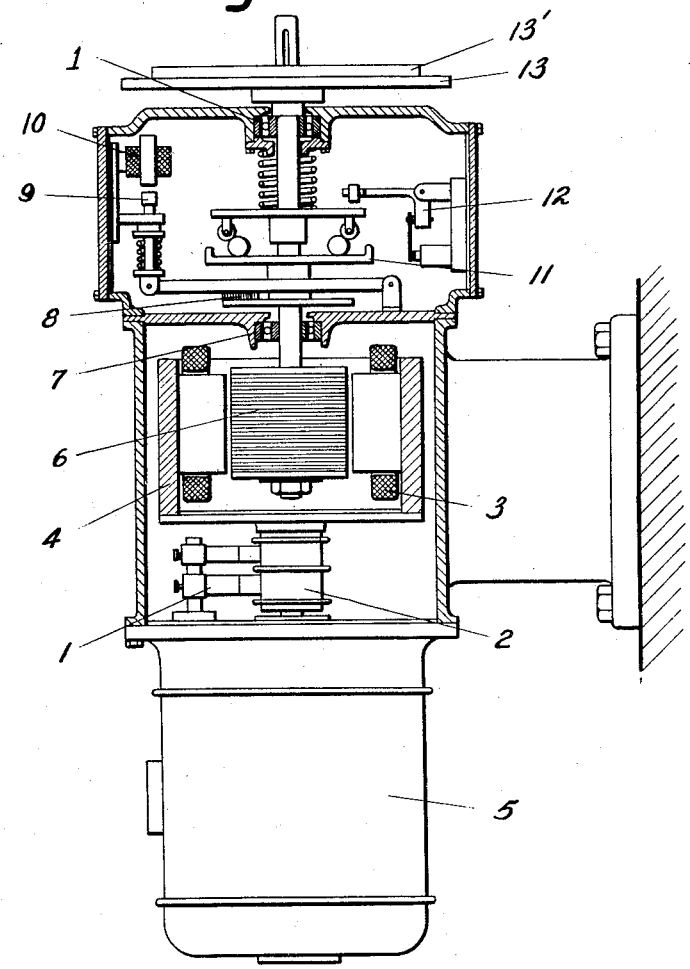
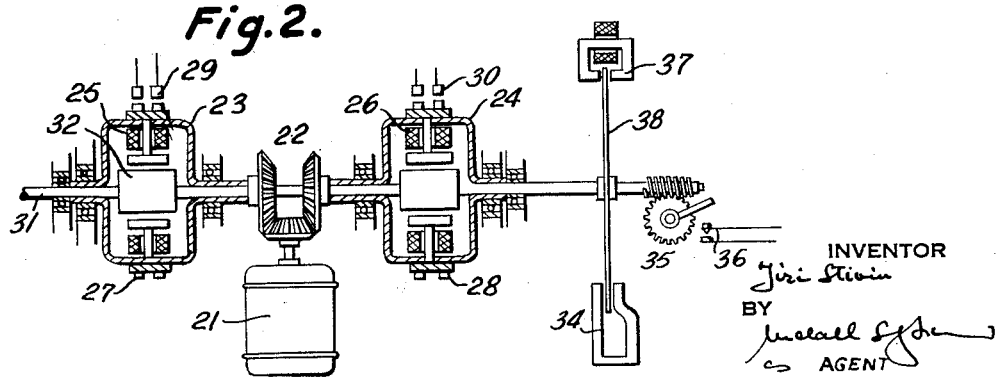
INVENTOR
Jiri Stivin
BY
AGENT Patented Dec. 13, 1949

2,491,340

UNITED STATES PATENT OFFICE 2,491,340

ELECTRICAL CONTROL SYSTEM

Jiří Stivín, Rychnov u Jablonce nad Nisou,
Czechoslovakia

Application February 25, 1947, Serial No. 730,830
In Czechoslovakia December 11, 1945

Section 1, Public Law 690, August 8, 1946
Patent expires December 11, 1965

10 Claims. (Cl. 171—97)

The present invention relates to a method and device for measuring an adjustable quantity of electric energy.

In numerous cases it is necessary to measure or allot a certain adjustable quantity of electric energy, which quantity has to be always exactly the same in repeated operations or supplies, irrespective of variable outer conditions, such as fluctuations in the voltage of the supplying net and the like.

Such a case occurs e. g. in connection with electrical heating of articles which have to be hardened, welded or similarly treated. In such operations heating by eddy currents is often employed, said currents being induced in the surface layers of the heated article by a suitable coil supplied by a high frequency current. To achieve the required uniform results, it is important that the temperature to which the object to be hardened is heated should in all instances be in precise accord with the respective directions and particularly in hardening of articles in mass production the temperature of all pieces should be as equal as possible. The above described method of electric heating satisfies this requirement to a considerable extent, but it is often impossible to avoid temperature differences or changes in the depth of the heated layer in consequence of variations in voltages supplied to the high frequency heating units. Such variations lead, of course, to varying results yielded by the heating unit so that the final temperature or thickness of the heated layer of the treated articles varies, if the heating of each article is carried out for an equal period of time as it is usual in accordance with the known practice.

In order to remove these drawbacks, it is suggested to refrain from measuring the time-interval and to measure instead the supplied quantity of electric energy, whereby the required temperature is always exactly attained; or under otherwise similar conditions—initial temperature, size of the object etc.—a throughout equal final temperature is achieved at which hardening takes place or an aqual thickness of the heated layer is obtained.

The method according to the invention is characterised in the first place by the fact, that the momentary electrical output is transformed into a measuring current, the square of which is proportionate to the output. If the resistance of the consuming device and the coefficient of efficiency are constant, the out-put may be directly determined as a square of the loading current or as a square of a portion of this current, said portion serving then as measuring current. If the operation has to be carried out under different conditions or with greater precision, the electrical output is transferred into a difference of squares of the two measuring currents in accordance with the following equation $$w \sim (i+Ke)^2 - (i-Ke)^2 = i_1^2 - i_2^2$$

in which
$w$ = output of the consuming unit
$i$ = loading current
$e$ = voltage on the consuming unit
$K$ = constant
$i_1, i_2$ = measuring currents.

For measuring the required quantity of electric energy it is then necessary to integrate the square of the measuring current or in the second case the difference of squares of two measuring currents.

In the device according to the invention a rotating system is supplied for this purpose by the measuring current, said system acting during its rotation upon a cooperating armature by a moment proportionate to the square of the measuring current, flowing through the said rotating system.

When two measuring currents are used, two systems rotating in opposite directions are employed, said systems being supplied by these currents and cooperating with two connected armatures, so that the moment acting upon such armatures connected together corresponds to the difference of squares of the two measuring currents.

The armature or the connected armatures may in both instances be provided either with a brake, generating a braking moment, proportionate to the revolutions of the armature or may be connected with a suitable inertia mass, which is brought into rotation together with the armature by the generated moment.

In the first case the armature or armatures will become stabilised on a certain angular velocity, proportionate to the controlled output. The supplied quantity of energy is then proportionate to the number of revolutions which have been carried out. In order to measure the required quantity of energy it is therefore sufficient to cut off the supply of energy after a corresponding number of revolutions has been carried out.

For this purpose either a suitable counter of revolutions is employed or when the number of revolutions is permanently adjusted the energising i. e. the measuring current, supplying the rotating system or systems may be changed by a suitable divider or resistance.

After the desired operation has been performed, the counter of revolutions has to be returned to its initial position. The time required therefor, may be employed for performing a further operation, e. g. for controlling the length of the interruption of work, or in the hardening operation to control the period of quenching or the like. It is an advantage that the duration of return of the revolution counter is dependent on the number of revolutions previously performed i. e. on the energy supplied, for instance during the heating operation, so that larger pieces which have been heated for a longer time, are then cooled for a longer time too.

In the second case in which the rotating armature is connected with inertia mass, for instance in the shape of a flywheel, the armature is set into rotation by an acceleration proportionate to the output. The supplied energy is therefore proportionate to the attained angular velocity of the armature. The supply of energy may thus be interrupted by suitable means when the adjusted angular velocity is reached.

The adjustment may be carried out in various ways:

1. By adjusting the limit of angular velocity of the armature either by an auxiliary dynamo, which is driven by the armature fly-wheel and supplies a voltage proportionate to the revolutions, a voltage relay interrupting the supply of energy when the adjusted voltage has been reached, or by means of a suitable centrifugal switch.

2. By changing the inertia mass connected with the armature. According to the invention the armature is preferably provided with a horizontal disc or shoulder on which fly-wheels of different moments of inertia may be placed. A set of such fly-wheels may be provided, said set being suitably selected so as to enable any desired moment of inertia being combined in a manner similar to a set of weights. The supplied energy may then actually be weighed by such flywheels.

3. By the use of a divider or a resistance in the circuit of the measuring currents in a manner similar to that used in connection with the braked armature, described above.

After the supply of energy has been interrupted the flywheel is braked to a standstill. Also in this case the braking period may be used e. g. for controlling the period of quenching. The period of braking is again proportionate to the attained angular velocity, which offers the same advantage as in the first mentioned case.

Two examples of carrying out a device according to the invention are diagrammatically represented in the accompanying drawing, wherein Fig. 1 denotes one embodiment of the device for measuring the amount of electric energy carried out according to the invention and Fig. 2 shows a modification thereof.

In both cases shown in the drawing the device is intended for use in connection with measuring of energy in high frequency hardening operations, in which the heating of the individual pieces has to be equal; for this purpose it is not sufficient to measure merely the period of time as explained above.

The measuring current is supplied preferably over a rectifier from a high frequency hardening inductor or, alternatively, with sufficient accuracy from a resistance, interposed into direct current circuit, supplying the anode. The branching off may be carried out, at the supplying side i. e. from the net, in the supply leads to the net transformer, if such an arrangement is desired. The obtained measuring current has then, of course, to be rectified.

The measuring current is supplied to brushes 1, cooperating with rings 2 of a winding 3 of a system 4 rotating permanently with uniform velocity, driven by a suitable electromotor 5. In the embodiment shown in the drawing the energising system 4 is carried out in the form of an outer rotor, cooperating with an inner armature 6. The armature 6 is of the cage type and is mounted in bearings 7. The shaft of the armature carries further a braking disc 8, adapted for cooperation with a braking block 9, operated by an electromagnet 10. The armature shaft carries further a centrifugal contact 11, which after a predetermined angular velocity has been reached closes the contacts 12. The armature shaft is further provided with a removable and changeable fly-wheel 13. In the device shown the shaft is mounted vertically.

At the beginning of the heating operation, i. e. at the beginning of the supply of energy, measuring current is being applied by means of the rings 2 to the winding 3 of the system 4 rotating with uniform velocity. The electromagnet 10 is simultaneously energised, withdrawing the braking block 9 from the braking disc 8. The armature 6 is entrained by the rotating system 4 and after a suitable speed of rotation i. e. a suitable angular velocity has been reached, the centrifugal switch 11 closes the contact 12 which interrupts the supply of energy and cuts off of the measuring current. The electromagnet 10 is also de-energised so that the braking block 9 is applied on the disc 8. At the same time the quenching spray is brought into operation in order to perform the hardening steps on the previously heated article.

The speed of rotation of the armature decreases and on reaching a predetermined limit, the centrifugal switch 12 opens again the contacts 12, said opening being now used for cutting off the supply of quenching liquid. The hardening operation is thus completed and the heating and hardening of a further piece may be started.

The quantity of supplied energy and thereby also the final temperature of the heated article may be changed by substituting the flywheel 13 for another, having a different moment of inertia. Preferably a whole set of such flywheels with different moments of inertia is provided in a way similar to the employment of different weights in a series of weights so that from a selected number of flywheels a total inertia mass having any desired moment of inertia, corresponding to the desired amount of supplied energy, may be combined. This method of changing the quantity of the required energy by combining different flywheels, is extremely simple and may be carried out by relatively unskilled persons.

The moment of inertia may, of course, be changed also by a change of position of the mass, which is brought into rotation, with respect to the axis of rotation, for instance by shifting a suitable weight.

Fig. 2 shows a further embodiment of the device according to the invention, wherein two measuring currents are used, the effect of which is subtracted from each other in the device. In this case the electromotor 21 drives two rotor systems with a uniform velocity over a suitable gearing 22. The gearing 22 is arranged e. g. by means of bevel gears in such a way, that one system 23 is driven in opposite direction to the other system 24. The pole windings 25, 26 of the two systems are supplied over rings 27, 28 and brushes 29, 30 by two measuring currents. The common shaft 31 carries two armatures 32 and 33, each of which cooperate with one rotor. The shaft 31 is mounted in suitable bearings as well as both rotors 23 and 24. The two rotors act upon the respective armatures by rotational moments, which are subtracted from each other, so that the armature shaft 31 is brought into rotation by the difference of the two moments. The shaft 31 carries further a disc 38, which is adapted to be braked by a permanent magnet 34. The armature shaft 31 is therefore rotated with a predetermined speed of rotation at which the driving moment is in equilibrium with the braking moment.

The shaft 31 drives a suitable counter of revolutions 35, shown in the drawing only diagrammatically, said counter of revolutions closing contacts 36 after the predetermined number of revolutions has been performed. After the desired quantity of energy, corresponding to this number of revolutions, has been supplied, the contacts 36 are closed, causing an interruption of further supply of energy and bringing into operation the quenching spray. Simultaneously a Ferraris motor 37 is brought into action, said motor rotating backwards the disc 33 together with the armature shaft 31 and counter of revolutions 35 until the initial or zero position is reached again. In this position the counter of revolutions interrupts by suitable means the further supply of the quenching liquid or water, thus completing the quenching and hardening operation.

Similar procedure is then applied for hardening a further piece.

While I have disclosed the principles of my invention in connection with particular embodiments it will be understood that these embodiments are given by way of example only and not as limiting the scope of the invention as set forth in the appended claims.

I claim:

1. In a device for measuring a selectively predetermined amount of electric energy, in combination, a rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings, means connected with relation to said armature for selectively adjusting the angular acceleration thereof, and means actuable by said armature for indicating the amount of energy absorbed by the device.

2. In a device for measuring a selectively predetermined amount of electric energy, in combination, a vertically disposed rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings, a flywheel detachably secured with relation to said armature for selectively varying the inertia momentum thereof, and a governor associated with said armature for indicating the angular velocity of the same and adapted to cut off the flow of electric current when said armature reaches a predetermined velocity.

3. In a device for measuring a selectively predetermined amount of electric energy, in combination, a rotatable armature, a rotatable magnet surrounding a portion of said armature but spaced therefrom an including windings and terminals for interconnection to an electric source, means connected to said magnet for revolving the same about the axis of said armature, whereby said armature will be rotated about its axis when current passes through said windings, adjustable brake means connected with relation to said armature and arranged to control the angular velocity of said armature whereby the same will rotate at substantially uniform velocity, and a counter associated with said armature for indicating the revolutions made thereby since the start of rotation thereof.

4. The combination with an electric apparatus receiving current of predetermined power in an electric circuit, of means for controlling the amount of power delivered to said apparatus, said control means connected in said circuit and adapted to receive a fraction of the electric current delivered to the apparatus sufficiently small so that the apparatus will receive substantially its full power, said control means comprising means for converting said fractional electric power into mechanical energy, an indicator associated with said converting means and operable thereby in response to absorption of a predetermined adjustable amount of energy, and switch means interconnected in said circuit and adjacent said indicator and actuable thereby to disconnect said apparatus and said control means simultaneously from said circuit, after a predetermined amount of energy has been absorbed by said control means.

5. In a device for measuring a selectively predetermined amount of electric energy, in combination, a rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings, adjustable brake means connected with relation to said armature and arranged to control the angular velocity of said armature whereby the same will rotate at substantially uniform velocity, a counter associated with said armature for indicating the revolutions made thereby since the start of rotation thereof, and means associated with said counter for indicating a selectively predetermined number of revolutions made by said counter since the start of rotation thereof.

6. In a device for measuring a selectively predetermined amount of electric energy, in combination, a rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings, adjustable brake means connected with relation to said armature and arranged to control the angular velocity of said armature whereby the same will rotate at substantially uniform velocity, a counter associated with said armature for indicating the revolutions made thereby since the start of rotation thereof, means associated with said counter for indicating a selectively predetermined number of revolutions made by said counter since the start of rotation thereof, and means for varying the number of predetermined revolutions determined by said means associated with said counter.

7. In a device for measuring a selectively predetermined amount of electric energy, in combination, a vertically disposed rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings; and a governor associated with said armature for indicating the angular velocity of the same and adapted to cut off the flow of electric current when said armature reaches a predetermined velocity.

8. In a device for measuring a selectively predetermined amount of electric energy, in combination, a vertically disposed rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings; and a centrifugal switch associated with said armature and adapted to cut off the flow of electric current when said armature reaches a predetermined velocity.

9. In a device for measuring a selectively predetermined amount of electric energy, in combination, a vertically disposed rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings, a flywheel detachably secured with relation to said armature for selectively varying the inertia momentum thereof; and a centrifugal switch associated with said armature for indicating the angular velocity of the same and adapted to cut off the flow of electric current when said armature reaches a predetermined velocity.

10. In a device for measuring a selectively predetermined amount of electric energy, in combination, a vertically disposed rotatable armature, a rotatable magnet surrounding a portion of said armature but spaced therefrom and including windings and terminals for interconnection to an electric source, means connected to said magnet for revolving the same about the axis of said armature, whereby said armature will be rotated about its axis when current passes through said windings; flywheel-type means having a variable inertia momentum and detachably secured with relation to said armature for selectively varying the inertia momentum thereof; and a governor associated with said armature for indicating the angular velocity of the same and adapted to cut off the flow of electric current when said armature reaches a predetermined velocity.

JIŘÍ STIVÍN.

REFERENCES CITED

The following references are of record in the file of this patent:

UNITED STATES PATENTS

| Number | Name | Date |
| --- | --- | --- |
| 2,231,695 | Vedder | Feb. 11, 1941 |
| 2,381,310 | Richter | Aug. 7, 1945 |
| 2,400,472 | Strickland, Jr. | May 14, 1946 |